March 13, 1956  L. E. DAVIS ET AL  2,738,414
VEHICLE SIGNAL LIGHT

Filed Nov. 27, 1951  3 Sheets-Sheet 1

INVENTORS
Louis E. Davis
Frederick Strube
BY George A. Knapp
Parker, Richmond Turner,
Attorneys.

March 13, 1956  L. E. DAVIS ET AL  2,738,414
VEHICLE SIGNAL LIGHT
Filed Nov. 27, 1951  3 Sheets-Sheet 2
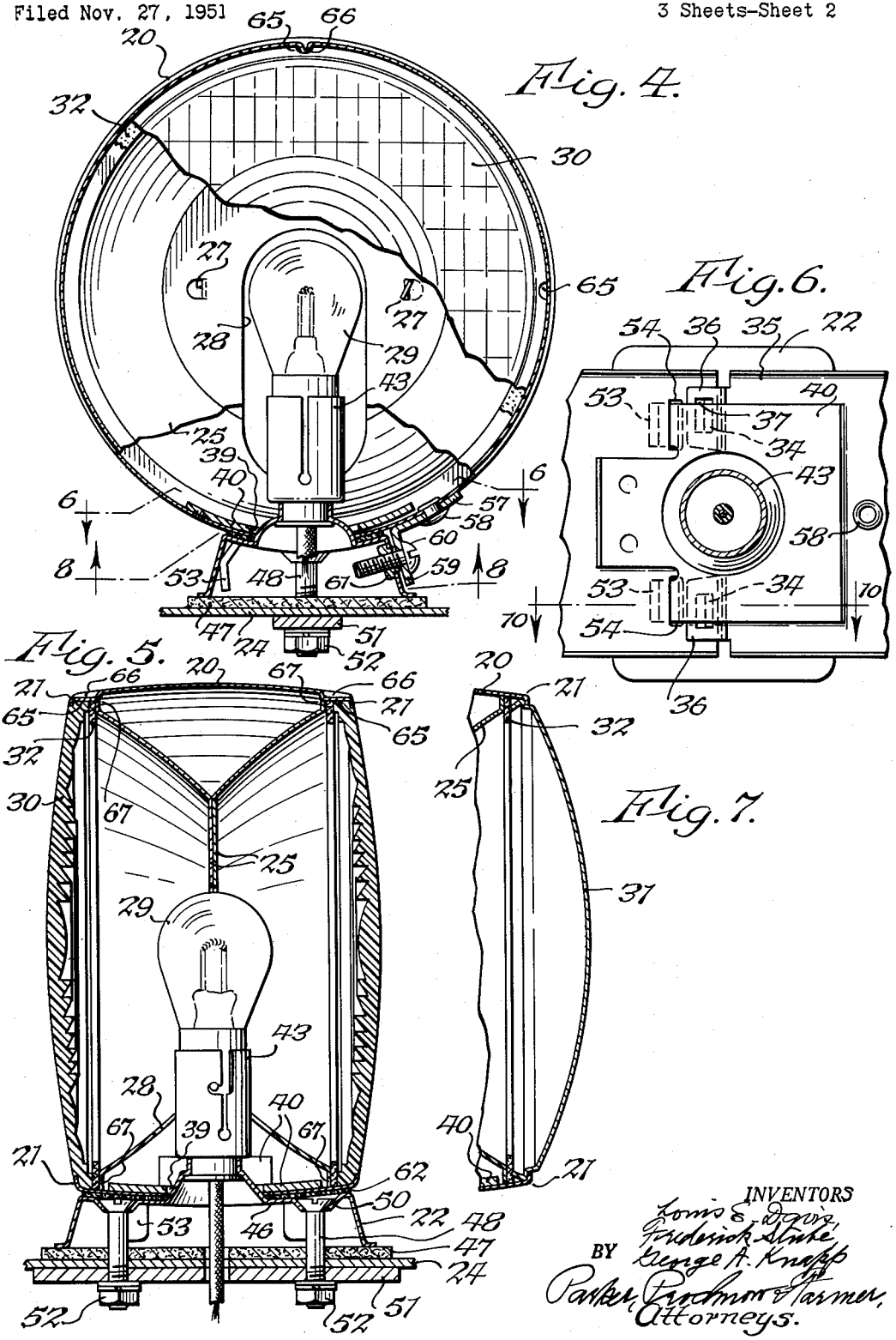

March 13, 1956 L. E. DAVIS ET AL 2,738,414
VEHICLE SIGNAL LIGHT
Filed Nov. 27, 1951 3 Sheets-Sheet 3
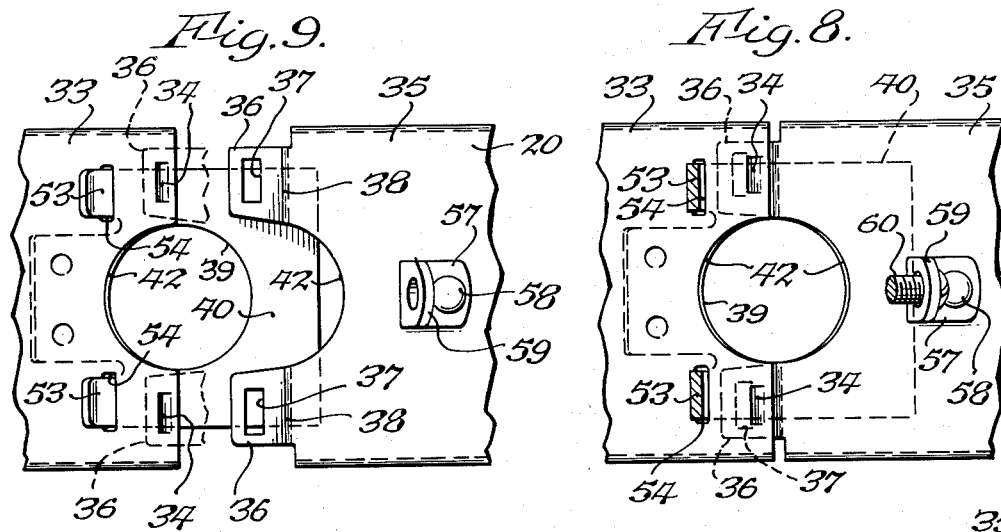
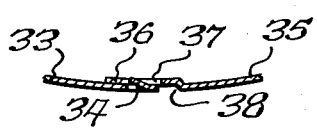
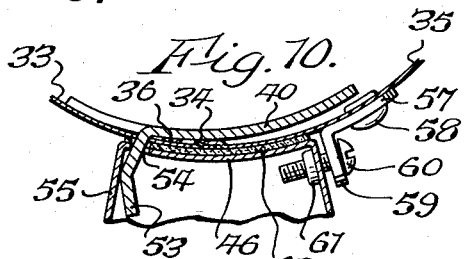
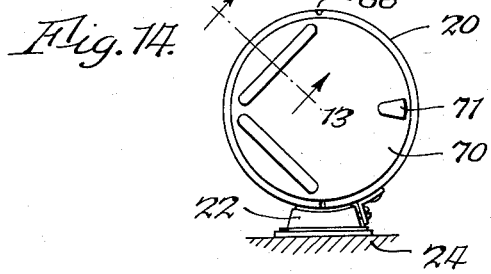
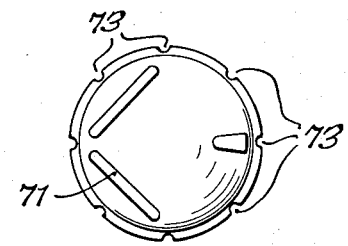
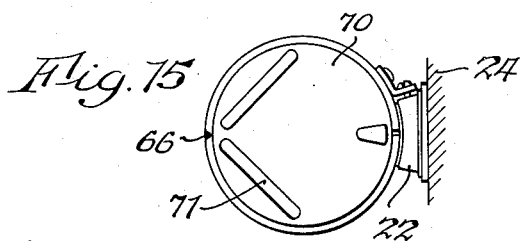
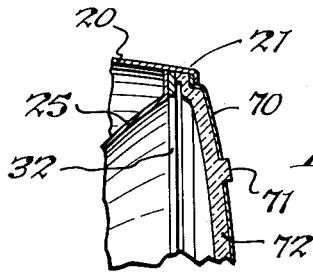
INVENTORS
Louis E. Davis
Frederick Strube
BY George A. Knapp
Parker, Trochman Harmer.
Attorneys.

United States Patent Office 2,738,414
Patented Mar. 13, 1956

2,738,414

VEHICLE SIGNAL LIGHT

Louis E. Davis and Frederick Stube, Syracuse, and George A. Knapp, De Witt, N. Y., assignors to R. E. Dietz Company, Syracuse, N. Y.

Application November 27, 1951, Serial No. 258,358

7 Claims. (Cl. 240—8.22)

This invention relates to signal units or lights such, for example, as may be used in connection with direction indicating signals on motor vehicles.

One object of this invention is to provide a signal light or unit of this type of improved construction which may be easily applied to a motor vehicle, and on which the lens or lenses may be readily adjusted as desired.

Another object is to provide a signal light of this type with means of improved construction for mounting the housing of the signal light on a base which may in turn be mounted on a part of the vehicle. A further object is to provide a construction of this kind in which the housing of the light may initially be secured to a base with all parts of the light assembled in correct relation to each other, whereupon the housing may be securely fastened to the base. Another object is to provide a light of this kind in which only a single screw or other fastening device is required for securing all parts of the light in correct relation to each other and to the base and which provides a weather-tight seal between the housing and the lens. It is also an object of this invention to provide a housing which is constructed to support the lens or lenses in different relation to the signal light so that the light may be mounted on different parts of the vehicle, and in which lenses of different types may be employed.

Other objects and advantages will be apparent from the following description of some embodiments of the invention, and the novel features will be particularly pointed out hereinafter in connection with the appended claims.

In the accompanying drawings:

Fig. 4 is a sectional elevation thereof on line 4—4, Fig. 1.

Fig. 5 is a central sectional elevation taken at right angles to Fig. 4.

Fig. 6 is a fragmentary, sectional view thereof on line 6—6, Fig. 4.

Fig. 7 is a fragmentary, sectional view thereof showing one of the lenses replaced by an opaque wall.

Fig. 8 is a sectional plan view thereof on line 8—8, Fig. 4.

Fig. 9 is a similar view showing the ends of the split housing separated to permit removal of parts from the interior of the housing.

Fig. 10 is a fragmentary, sectional elevation thereof on line 10—10, Fig. 6.

Fig. 11 is a fragmentary, sectional view showing the ends of the split housing interlocked.

Fig. 12 is a face view on a reduced scale of a lens of another type for use in connection with the signal light.

Fig. 13 is a fragmentary sectional view on line 13—13, Fig. 14.

Fig. 14 is a face view of a signal light having the lens of modified construction.

Fig. 15 is a view of the signal unit shown in Fig. 14, mounted on an upright surface.

Figure 1:
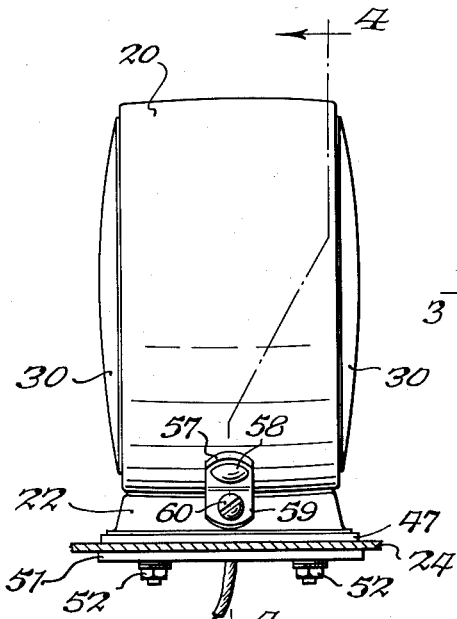
Fig. 1 is a side elevation of a signal unit or light embodying this invention.
Figure 2:
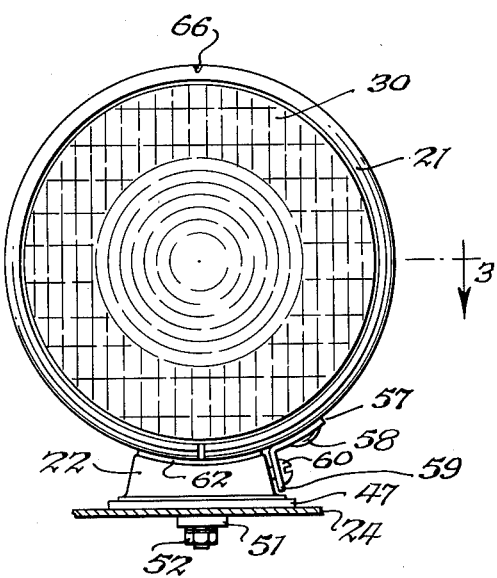
Fig. 2 is a front elevation thereof.

The unit or signal light includes a body or housing 20 in the form of a flexible split ring which is provided at opposite edges thereof with inwardly extending flanges 21 for engaging the lens or lenses used in connection with the unit when the split housing is contracted. The housing is mounted on a base 22 which may be suitably secured to any desired part of the vehicle. The signal light also includes a reflector 25 arranged within the housing, that shown being made of two identical dished parts having their open ends facing in opposite directions and having substantially flat inner portions which are secured together in any suitable manner, for example, by upwardly bent lips or projections 27 of one reflector part extending through slots in the flat portion of the other reflector part, and then twisted to prevent the lips from being withdrawn through the slots. The reflector is provided with an opening 28 into which a light bulb 29 may extend.

30 represents a lens of the signal light, two of which are shown in Figs. 1 to 5, but one of these lenses may, if desired, be replaced by an opaque wall or disk 31, as shown in Fig. 7. Resilient gaskets 32 are preferably located between the lenses or wall 31 and the reflector. It will be obvious from the foregoing description that if the split housing is flexed to separate the ends thereof which terminate at the transverse split of the housing, the lenses will be released from engagement by the flanges 21 of the housing, so that they can be readily removed from the housing or differently positioned therein, and similarly, the reflector which is held in place between the lenses may also be removed from the interior of the split housing.

In order to secure together the ends of the split housing for the purpose of clamping the lenses and reflector in place therein, I provide one end 33 of the housing with projections or tabs 34 which may be formed by partly stamping out portions of the housing and bending the free ends of the tabs inwardly, see particularly Fig. 11. The other end 35 of the housing is provided with a pair of projecting lugs 36 provided with slots or perforations 37 arranged in such a manner that when the two ends of the housing are pressed together, the tabs 34 of the housing end 33 will enter into the slots 37 of the other end of the housing and thus hold the ends of the housing against separation. To facilitate the connecting together of the two ends of the housing, the lugs 36 are preferably offset as shown at 38, Fig. 11, so that these lugs will readily slide into engagement with the opposite end 33 of the housing.

In order to further facilitate the guiding of the lugs 36 into operative relation to the projections or tabs 34 of the other end of the housing, we provide a guide plate or reinforcing member 40 which is permanently secured at one end thereof to an end portion of the split housing, for example, to the end portion 33, and this reinforcing or guide plate may be secured to the housing, for example, by means of welding. This guide member is so formed that it is spaced to a slight extent from the tabs or projections 34. This may be accomplished, for example, by forming the guide member 40 with a curvature of slightly less radius than that of the housing. Consequently, this guide member forms with the housing end 33 a guide slot into which the slotted portion of the end 35 of the housing may pass for interlocking with the tabs or projections 34 of the housing end 33. The guide plate 40 has the further function of yieldingly holding the tabs or projections 34 within the slots 37 of the housing end 35. The opposite ends of the housing at the split are provided with semi-circular recesses 42 which together form an opening through which the light bulb 29 and its base 43 may readily pass, and the guide plate has a hole 39 therein for the same purpose.

In accordance with this invention, the same means are provided for securing the housing to the base and also for further contracting the housing so that the same tightly grips the lens or lenses and the reflector. In the construction shown by way of example, the base 22 is of hollow, substantially rectangular form having an upper wall 46 which is substantially of the same curvature as the housing 20, and extends across the split portion of the housing. The lower part of the base may rest upon a pad or gasket member 47 interposed between the base 22 and a part 24 of the vehicle. Securing means of any desired type for mounting the base on the vehicle may be provided, and in the construction shown, bolts 48 are provided, the heads of which are seated in recesses 50 formed in the upper wall 46 of the base. These bolts extend through holes in the gasket member 47 and through holes drilled in the vehicle part 24. A backing plate 51 is preferably arranged on the opposite surface of the vehicle part 24, and nuts 52 on the bolts 48 serve to draw the base against the gasket member 47 and to draw the plate 51 against the opposite surface of the vehicle part 24. Any other means for securing the housing on a part of the vehicle may be employed if desired.

In order to secure the housing member 20 on the base, the two ends of the housing are provided with lugs or projecting parts by means of which the housing may be secured to the base. In the particular construction shown by way of example, the lugs or projecting parts of the end 33 of the housing are formed as follows: the reinforcing or guide plate 40 is provided with a pair of lugs or projections 53 preferably formed integral therewith and extending through suitable apertures in the housing end or part 33. These lugs may be engaged by the base in any desired manner. In the construction shown by way of example, the top wall 46 of the base is provided with slots or apertures 54 through which the lugs 53 extend into the interior of the base. The lugs or projections 53 are formed to engage with one of the downwardly diverging side walls of the base, see Fig. 10.

The other end portion 35 of the housing is provided with an angle piece 57 suitably secured thereto, for example, by means of a rivet 58. This angle piece includes a lug 59 extending outwardly from the housing 20 adjacent to a side wall of the base opposite to that engaged by the lugs 53. The lug 59 is provided with apertures through which a screw or other fastening device 60 may pass, this screw having a threaded connection with a part of the base, such for example, as with a threaded sleeve or bushing 61 arranged in the side wall of the base. Consequently, when the screw 60 is tightened, it will be obvious that the end portion 35 of the housing will be urged toward the end part 33, thus tending to contract the housing and also to rigidly secure the two ends of the housing to the base.

In the use of the construction thus far described, when the lens or lenses and the reflector have been correctly located with reference to the housing while the ends thereof at the split are separated, the housing may be readily contracted and temporarily secured together by moving the end 35 into the space between the guide member 40 and the other end 33 so that the tab 34 will enter into the slot 37. The housing can readily be contracted in this manner by merely gripping the lugs 53 and 59 by a finger and thumb and pressing the ends of the housing toward each other. This initial locking of the housing ensures the gripping of housing and parts contained therein together against disarrangement. The light bulb and its socket 43, which are mounted on the upper wall of the base, are then inserted through the openings therefor formed in the ends of the housing and in the reflector. The lugs 53 of the reinforcing or guide members 40 are then inserted through the slots 54 in the upper wall of the base. The screw 60 may then be passed into the screw threaded sleeve or bushing 61 and tightened as shown in Fig. 10, so that the housing will be further contracted and the flanges 21 thereof secured in gripping engagement with the lens or lenses. During the tightening of the housing by the screw 60, the tabs or latches 34 will move out of engagement with the ends of the slots 37, as shown in Fig. 10, and are no longer depended upon to hold the ends of the housing together, but upon loosening the screws, the tabs will again engage the ends of the slots to limit the extent to which the ends of the housing may become separated. A resilient pad 62 is preferably placed between the housing and the base. When the screw 60 is tightened the lug 53 is forced against the inclined side wall 55, Fig. 10, of the base so that upward movement of this tab relatively to the base is prevented.

For replacing a light bulb, it is merely necessary to loosen the screw 60 so that the housing can be removed from the base. As the screw 60 is loosened, the tabs 34 will engage in the slots 37 so as to prevent disarrangement of the lenses and reflector relatively to the housing while the light bulb is being changed. The housing may then again be secured to the base by means of the screw 60, as heretofore described.

If it is desired to remove the lenses, it is merely necessary, after the housing has been removed from the base, to insert a knife blade or screw driver between the lugs or extensions 36 and the end 33 of the housing, whereupon the tabs or latches 34 can be readily disengaged from the slots or recesses 37, so that the ends of the split housing may be separated to open the housing and permit the parts contained therein to be removed, adjusted or replaced.

Figure 3:
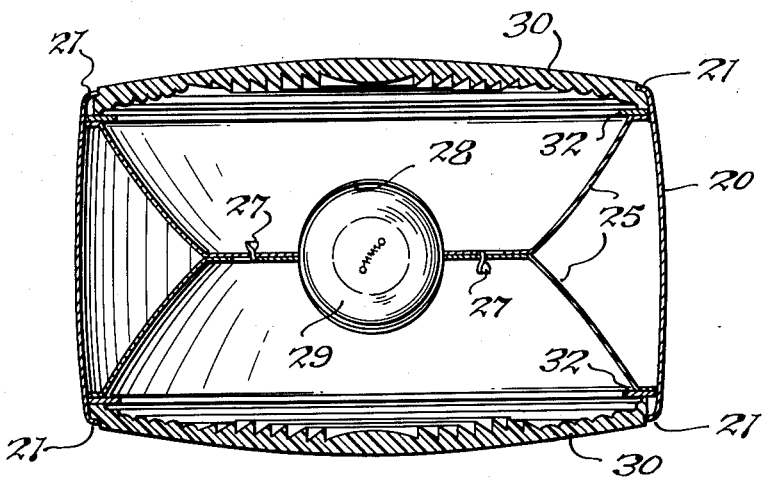
Fig. 3 is a sectional view thereof on an enlarged scale on line 3—3, Fig. 2.

The flanges 21 of the housing, as clearly shown in Figs. 3 and 5 are substantially frusto-conical, extending inwardly at an acute angle to a radial plane of the light, thus flaring laterally or axially to a slight extent away from the interior of the light housing and toward an extension of the axis of the signal light. As a result of this construction, it will be noted that when the housing is contracted, for example, by means of the screw 60, the inclination or flare of the flanges 21 results not only in a contraction of the housing about the lenses or screen plates, but also forces these lenses toward the central radial plane of the light housing, thus compressing the gaskets 32 against the parts on which they bear, such for example as the outwardly turned flanges or shoulders at the outer ends of the reflectors 25. This inward movement of the lenses, consequently, results in a compression of the gaskets 32 in a manner to exclude moisture or other foreign material from the interior of the light housing. This inward force exerted by the flaring shoulders against the lens, the gasket and the shoulders within the housing also holds these parts against any rattling or vibration, and by providing these flaring shoulders on opposite sides of the housing, the reflector or other shouldered part within the housing is firmly clamped in place therein. The same result can, of course, be accomplished if the portion of the lens engaged by the inwardly extending flange 21 of the housing flares with reference to a radial plane of the light in the same manner as the flare of the flange 21, or if desired, both the flange and the outer edge portion of the lens engaged thereby may be flared, as clearly shown in Figs. 3 and 5.

It is also desirable to provide means to facilitate the correct mounting of the lenses and the reflector in the housing, and for this purpose the lenses and reflector are preferably provided in their peripheral portions with notches or recesses which cooperate with parts on the housing. For example, the lenses shown in Figs. 1 to 6, see Fig. 4, may be provided with notches 65 arranged approximately 90 degrees apart, and the housing 20 is provided at the opposite edges thereof with inwardly extending projections or depressions 66 formed so as to enter into the notches of the lenses. Also, the peripheral portions of the reflector are provided with notches or recesses 67 into which the depressions or indentations 66 of the housing may enter. These notches in the reflector ensure the proper positioning of the same relatively to the housing so that the opening 28 in the reflector will be in correct relation to the opening in the housing provided by the recesses 42 in the ends thereof. Consequently, in assembling the parts of the signal light, the lenses and reflectors are so positioned relatively to the housing that the depressions 66 in the housing enter into the notches or recesses in the lenses and reflector, whereupon the correct relative location of these parts is assured. The particular lens shown is so constructed as to be of maximum efficiency when arranged in a particular position relatively to the horizontal. Also the base 22 of the housing may be mounted on a horizontal surface on a vehicle or on a vertical surface. Consequently, the lenses may be positioned as shown in Fig. 4, or at 90 degrees from this position, by turning the lens through a corresponding angle. It may also be necessary at times to turn the base of the light end for end so that the screw 60 will be accessible, and in such cases the lenses may be readily positioned as may be required.

Lenses of any suitable or desired type may be used in connection with our improved light housing. Instead of providing lenses which are transparent throughout their surfaces, lenses may be employed such as shown in Figs. 12 to 15, in which portions of the lenses are covered by opaque screens or plates 70, Fig. 13, which have openings through which portions 71 of the lenses 72 may extend, for example, to form arrow-shaped figures as shown in Figs. 12 to 15. In Fig. 12 we have shown a lens having notches 73 therein spaced 45 degrees apart to permit additional adjustments of the lenses within the housings, such as may be necessary when the base of the light is mounted on a part of a vehicle extending at an angle to the horizontal and vertical. In connection with these modified forms of lenses, the same base, housing and reflector which has been described, may be employed.

It will be understood that various changes in the details, materials and arrangements of parts which have been herein described and illustrated in order to explain the nature of the invention, may be made by those skilled in the art within the principle and scope of the invention as expressed in the appended claims.

We claim as our invention:

1. A signal light including an annular split flexible housing, a lens held by said housing, the ends of said housing at said split having portions movable into overlapping relation to each other, one end of said housing being provided with a projection and the other end of said housing having an aperture into which said projection extends when the ends of said housing are moved to contract said housing, and a guide plate secured to said first end of the housing and extending in spaced relation to said end and said projection and forming a space into which the other end of said housing may be inserted to guide said projection and aperture into interlocking engagement with each other.

2. A signal light including an annular split flexible housing, a lens held by said housing, the ends of said housing at said split having portions movable into overlapping relation to each other, interlocking parts on the end portions of said housing for temporarily holding said ends in overlapping relation to each other, a base for said signal light, parts extending outwardly from each end of said housing, and pressure applying screw means on said base for drawing said other parts together for simultaneously securing said housing to said base and contracting said housing.

3. A signal light including an annular split flexible housing, a lens held by said housing when the same is contracted, a reflector arranged within said housing, the ends of said housing adjacent to said split overlapping, interlocking parts on the overlapping ends of said housing which engage when said housing is partially contracted to hold said lens and reflector in correct relation to said housing, a base on which the split portion of said housing is mounted, and means on said base for further contracting said housing for tightly gripping said lens and reflector.

4. A signal light including an annular split flexible housing, a lens held by said housing, the ends of said housing at said split having portions movable into overlapping relation to each other, interlocking parts on the end portions of said housing for holding said ends in overlapping relation to each other, a guide plate secured to one end of said housing and extending into spaced diverging relation thereto to form a space into which the other end of said housing may be inserted to guide said interlocking parts into engagement, a base for said signal light, said guide plate having an outwardly extending part engageable with said base, a lug on the other end of said housing extending into proximity to said base, and means for urging said lug toward said base against the reaction of said part of said guide plate to contract said housing and secure the same to said base.

5. A signal light including an annular split flexible housing, a lens held by said housing, the ends of said housing at said split having portions movable into overlapping relation to each other, interlocking parts on the end portions of said housing for temporarily holding said ends in overlapping relation to each other, a base for said signal light, a light source mounted on said base, said housing having an opening at said split through which said light source may be passed into and out of said housing, parts extending outwardly from each end of said housing into operative relation to said base, and pressure applying screw means on said base for drawing said last mentioned parts of said housing together for simultaneously securing said housing to said base and contracting said housing.

6. A signal light including an annular split flexible housing, a lens held by said housing, said housing having an annular flange formed to engage the edge portion of said lens for holding said lens in said housing, said lens having notches in the peripheral portion thereof arranged at different positions about the periphery of said lens, and an inwardly projecting part on said housing formed to enter one of said notches for supporting said lens in correct relation to said housing.

7. A signal light including an annular split flexible housing, a lens held by said housing, said housing having an annular flange formed to engage the edge portion of said lens for holding said lens in said housing when the same is contracted, an annular shoulder within said housing adjacent to the inner edge portion of said lens, a gasket interposed between said shoulder and said lens, said annular flange and said outer surface of the peripheral portion of said lens having cooperating surfaces, at least one of which is substantially frusto-conical and inclined outwardly toward an extension of the axis of said light, and means for contracting said housing about said lens for causing said cooperating surfaces of said flange and said lens to press said lens in an axial direction toward said gasket.

References Cited in the file of this patent

UNITED STATES PATENTS

| | | |
|---|---|---|
| 1,534,222 | Lackstrom | Apr. 21, 1925 |
| 1,544,420 | Basterreix | June 30, 1925 |
| 1,564,118 | Ayler | Dec. 1, 1925 |
| 1,796,694 | Silva | Mar. 17, 1931 |
| 2,614,207 | Smith | Oct. 14, 1952 |